United States Patent [19]

Kechely

[11] 4,013,135
[45] Mar. 22, 1977

[54] APPARATUS FOR SUPPORTING AND WEIGHING PATIENTS IN A SITTING POSITION

[76] Inventor: Raymond O. Kechely, 2635 Tamalpais Drive, Pinole, Calif. 94564

[22] Filed: Dec. 29, 1975

[21] Appl. No.: 644,397

[52] U.S. Cl. .................... 177/144; 177/145; 177/245; 297/417; 297/DIG. 4
[51] Int. Cl.² .............. G01G 19/52; G01G 19/00; B60N 1/06
[58] Field of Search .............. 177/144, 145, 245; 297/411, 417, DIG. 4

[56] References Cited
UNITED STATES PATENTS

| | | | |
|---|---|---|---|
| 1,478,640 | 12/1923 | Coverly | 297/417 X |
| 3,244,453 | 4/1966 | Fox | 297/DIG. 4 |
| 3,376,066 | 4/1968 | Kernes | 297/417 |
| 3,550,958 | 12/1970 | Krein | 297/417 |
| 3,630,299 | 12/1971 | Albagli | 177/145 |
| 3,732,938 | 5/1973 | Nelson | 177/245 X |
| 3,865,434 | 2/1975 | Sully | 297/417 |

*Primary Examiner*—George H. Miller, Jr.
*Attorney, Agent, or Firm*—Townsend and Townsend

[57] ABSTRACT

A chair including a backrest and lateral arm rests is attached to a scale. At least one of the arm rests can be opened to provide lateral access to the chair by pivoting it about a vertical axis through an arc of 180° to enable the positioning of the chair in close proximity with beds and the like for the transfer of disabled patients. Details of the construction of the openable arm rests and the mechanism for moving the arm rest and locking it in place are described.

9 Claims, 4 Drawing Figures

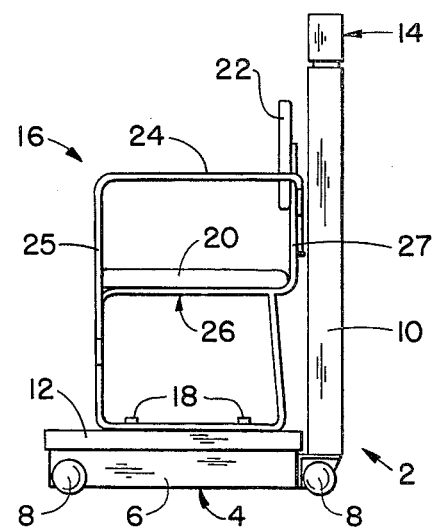
FIG._1.
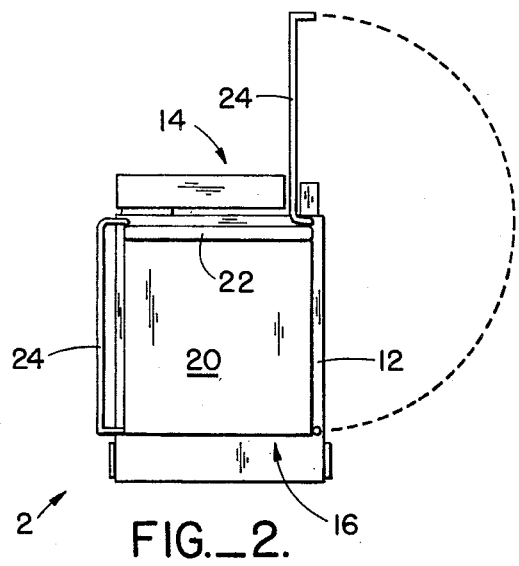
FIG._2.
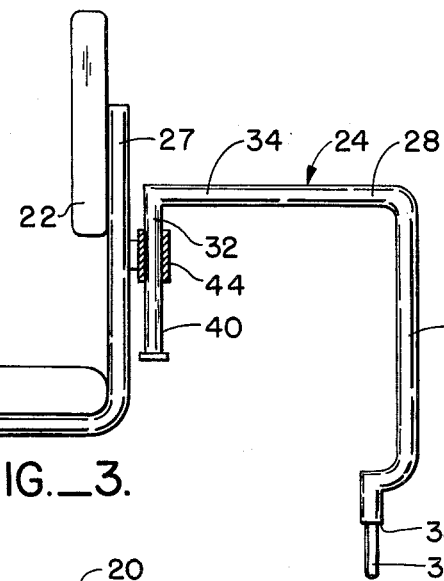
FIG._3.
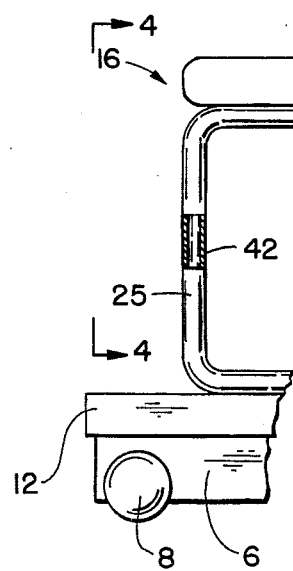
FIG._4.

APPARATUS FOR SUPPORTING AND WEIGHING PATIENTS' IN A SITTING POSITION

BACKGROUND OF THE INVENTION

The determination of body weight and its fluctuations of hospitalized and disabled patients is often of great importance, particularly, in cases of actual or impending electrolyte and water imbalance. This determination supplements laboratory data, makes their interpretation easier, more accurate, more relevant and more meaningful. It provides the clinical observer with objective information which may prove vital for proper and successful treatment.

Because of the patient's disability, it is often necessary to weigh the patient while supporting him in a sitting position. So-called chair scales have in the past been employed therefor. The horizontal sitting surface of the chair together with a backrest and lateral arm rests provide the necessary patient support. Although it represents no problem for a fit and healthy person to sit down on and to alight himself from the chair, for disabled or injured persons this task might be difficult or impossible. To facilitate the patient movement, prior art chair scales have incorporated arm rests that could be opened. Generally speaking, such arm rests could be opened to a limited extent, say over an arc of 45°–60° from the normal closed position. In other prior art scales the arm rest could be completely removed to facilitate the egress or ingress of a patient.

The former type of chair scale has the disadvantage that the arm rest, when pivoted into its open position, protrudes laterally and constitutes an obstacle to passerbys. Furthermore, it obstructed the lateral access to the chair. More importantly, the laterally protruding arm rest makes it difficult or impossible to position the chair scale against a patient's bed for the transfer of the patient from the bed to the chair by slidably moving him laterally onto the chair.

Chair scales having completely removable arm rests eliminate the problems caused by laterally protruding arm rests. However, such chairs are cumbersome to handle and attendants can forget to replace the arm rest during the weighing operation. Since the arm rest forms part of the chair scale's deadweight, its unaccounted removal leads to an inaccurate weighing. Such chair scales are therefore relatively undesirable.

Lastly, chair scales without any arm rests eliminate the problems of either one of the previously discussed scales. However, such chair scales do not provide lateral patient support which, in many instances, is mandatory to prevent the patient from slumping sideways and possibly falling from the chair.

Accordingly, prior art chair scales have operational disadvantages which, in the past, have not been fully overcome.

SUMMARY OF THE INVENTION

The present invention provides a chair scale which eliminates the above discussed shortcomings encountered with prior art chair scales. Generally speaking, a chair scale constructed in accordance with the prior art comprises a scale and a chair for the patient mounted to the scale. The chair includes a backrest and arm rests to provide support for the patient while in a sitting position. At least one of the arm rests is pivotable through 180° into an open position to provide access to the chair from a side thereof. The chair includes a generally upright, Z-shaped support frame disposed adjacent the side of the chair fitted with the openable arm rest. First and second vertically oriented sleeves have open upper end and are mounted to the frame adjacent the forward and aft portions of the frame. A generally U-shaped member defining the openable arm rest has a pair of spaced-apart, vertical legs and an intermediate portion interconnecting upper ends of the legs. Each leg includes a slidable portion that is linearly movably disposed in the respective sleeves to restrain the member to the frame and provide a secure arm rest and patient support.

The slidable portion at the forward leg defines the free end of such leg so that it can be linearly withdrawn from its associated sleeve. That slidable portion has a lesser length than the slidable portion of the aft leg so that the U-shaped member can be lifted in a vertical direction, thereby disengaging the slidable portion on the forward leg from the associated sleeve, while the slidable portion on the aft leg remains within its associated sleeve. The U-shaped member can then be pivoted about the vertical axis of the aft leg through an arc of about 180° between the fully opened and the fully closed positions.

Means is further provided for limiting the downward movement of the U-shaped member when it engages both sleeves to thereby establish a firm arm rest of predetermined height. The scale also includes means for preventing the complete disengagement of the U-shaped member from the aft sleeve to prevent the removal of the U-shaped member from the chair scale and the accidental weighing of a patient without the openable arm rest in place and forming part of the recorded weight.

Since the arm rest can be pivoted 180° from its normal fixed, supporting position it no longer protrudes laterally. Consequently, the chair can be positioned sideways against a bed for the transfer of a patient to the chair. Patient handling and comfort is thereby greatly improved. Moreover, the arm rest remains at all times fixed to the chair so that the attendant cannot inadvertently remove the rest and then fail to replace it during the weighing operation which, in the past, was possible and could lead to wrong measurements.

Moreover, the construction of the arm rest, its mounting and the mechanism permitting it to be opened while preventing its withdrawal is simple, yet highly efficient. Consequently, the present invention greatly improves the operating characteristics and ease of handling of chair scales while adding little to the cost of such scales.

BRIEF DESCRIPTION OF THE DRAWINGS

FIG. 1 is a side elevation of a chair scale constructed in accordance with the present invention;

FIG. 2 is a plan view of the chair scale shown in FIG. 1;

FIG. 3 is an enlarged, fragmentary side elevation of the chair showing the arm rest in its open position and further showing constructional details of the openable arm rest; and FIG. 4 is a fragmentary, enlarged front elevational view, partially in section, is generally taken on line 4—4 of FIG. 3, and illustrates the lower forward portion of the arm rest when it is in its closed position.

DESCRIPTION OF THE PREFERRED EMBODIMENTS

Referring to the drawings, a chair scale constructed in accordance with the present invention broadly comprises a scale 2 which has a support frame 4 including a base 6. Casters 8 enable the ready movement of the scale over the floor. An upright, rearwardly disposed post 10 houses the mechanism which connects weighing platform 12 with the balance, a visual indicator and the like collectively identified by reference numeral 14. The exact construction of such scales is well-known, does not form part of the present invention and is, therefore, not further described herein. Such scales are commercially available, for example, from the Acme Scales Company of 5303 Adeline Street, Oakland, Calif.

A chair 16 is secured to the weighing platform 12 with mounting bolts 18 and it comprises a flat seating surface 20, a backrest 22 disposed at the aft end of the seating surface and arm rests 24, 26 disposed laterally of the seating surface. A generally Z-shaped frame 26 supports the components of the chair.

Either one or both of the arm rests are mounted so that they can be pivoted through an arc of about 180° from its closed, patient-supporting position into its open position as is diagramatically demonstrated in FIG. 2. The arm rest is defined by a generally U-shaped member 28, preferably constructed of a tubular material. The U-shaped member has a forward leg 30, an aft leg 32 and a generally horizontally disposed intermediate section 34 which interconnects the upper ends of the legs. The forward leg includes a reduced diameter lower end portion 36 which is straight, vertically oriented, and which terminates at a downwardly facing annular shoulder 38.

The aft leg 32 of the U-shaped member includes a straight, vertically oriented shaft portion 40 which is parallel to end portion 36 of the forward leg and which, in the preferred embodiment, defines the lowermost free end of the aft end. For purposes more fully described hereinafter the length of shaft portion 40 is substantially greater than the length of end portion 36.

Sleeves 42 and 44 are permanently secured, e.g., welded to the lower forward portion 25 and the upper aft portion 27, respectively, of Z-shaped frame 26. The sleeves have interior diameters so that the lower end portion 36 and shaft portion 40 can be slidably received therein. The sleeves have open upper ends and they are parallel, vertically oriented and positioned so that the lower end portion 36 and shaft portion 40 can be received therein to immovably support the U-shaped member in its closed position to define the arm rest 24 for the patient. The annular shoulder 38 on the forward leg of the U-shaped member engages the upper end of sleeve 42 and vertically positions the arm rest at the desired height.

When the arm rest is to be opened the operator simply grasps the horizontal section 34 of the U-shaped member and lifts it up until lower end portion 36 of the forward leg is completely disengaged from sleeve 42. Shaft portion 40 of the aft end 32 is of sufficient length so that it remains fully engaged by sleeve 44. Moreover, to prevent the accidental disengagement of the U-shaped member from sleeve 44 a collar 46 is preferably attached to the free end of the aft leg to prevent the U-shaped member from being axially pulled out of engagement with sleeve 44.

The operation of the chair scale of the present invention, and particularly of the openable arm rest should now be apparent. To briefly summarize it, when a disabled or handicapped patient is to be weighed the arm rest is opened by lifting U-shaped member 28 to disengage lower portion 36 of forward leg 30 from forward sleeve 42. The member is then pivoted about the vertical axis of aft leg 32 and sleeve 44 through 180° to provide free lateral access to the chair. The chair is now moved to the patient's sitting surface, say his bed and the patient is transferred to the chair, e.g., by slidably moving him sideways onto the chair's sitting surface 20. Thereafter, the U-shaped member is pivoted back into its closed position in which lower forward shaft portion 36 is aligned with forward sleeve 42. The U-shaped member is released and drops gravitationally downward until the annular shoulder 38 of the forward leg engages the upper end of sleeve 42. The arm rest is now firmly secured to the chair and provides the desired and needed lateral patient support.

After the weighing operation has been completed the arm rest 24 is opened as above-described and the patient is transferred from chair 16 to his bed, another chair or the like.

To increase the versatility of the chair scale of the present invention, both arm rests 24, 26 can be constructed as above-described so that lateral access can be provided from either side of the chair.

I claim:

1. Apparatus for weighing a patient in a sitting position comprising a scale, a chair attached to the scale, an arm rest mounted to the chair for supporting the patient, and means for pivotally moving the arm rest between a closed position and an open position about a substantially upright axis through approximately 180°

2. Apparatus according to claim 1 wherein the arm rest comprises a generally U-shaped member having first and second plug portions at respective ends of the member, and including sleeve means secured to the chair for slidably receiving the plug portions, the sleeve means having parallel axes so that the member can be linearly moved to engage and disengage one of the plug portions with one of the sleeves.

3. Apparatus according to claim 2 wherein one of the plug portions has an axial extent substantially greater than the axial extent of the other plug portion so that one plug portion remains in engagement with the corresponding sleeve after the other plug portion has been disengaged from its corresponding sleeve.

4. Apparatus according to claim 3 including means limiting the extent to which the U-shaped member can be linearly moved.

5. Apparatus for weighing a patient in the sitting position comprising in combination a scale, a chair for receiving the patient in a sitting position, means securing the chair to the scale so that a patient sitting on the chair can be weighed with the scale, and at least one arm rest mounted to the chair, the arm rest including a generally U-shaped member terminating in upright, parallel first and second end portions, first and second spaced-apart, parallel, upwardly opening sleeves connected to the chair positioned and arranged for receiving the respective end portions of the U-shaped member to define said arm rest, the first end portion being substantially longer than the second end portion so that the U-shaped member can be lifted in an upright vertical direction until the second end portion is disengaged from the second sleeve while the first end portion remains in engagement with the first sleeve, whereby the arm rest can be pivoted about a vertical axis into an open position providing unobstructed lateral access to the chair.

6. Apparatus according to claim 5 including means limiting the extent to which the end portions can move in a downward direction when they are in engagement with the sleeves.

7. Apparatus according to claim 6 including means preventing the simultaneous disengagement of the U-shaped member from both sleeves.

8. Apparatus according to claim 6 including a second U-shaped member having first and second end portions and associated first and second sleeves defining a second openable arm rest on a side of the chair opposite the first mentioned U-shaped member.

9. Apparatus for supporting a patient in a sitting position and for weighing the patient comprising a scale; a chair for the patient mounted to the scale, the chair including a rearwardly positioned backrest and a pair of lateral arm rests to provide support for the patient while in a sitting position, at least one of the arm rests being pivotable through an arc of about 180° into an open position to provide access to the chair from a side thereof, the chair including a generally upright, Z-shaped support frame disposed adjacent the side of the chair fitted with the openable arm rest; first and second vertically oriented sleeves mounted to the frame adjacent a relatively lower forward portion of the frame and adjacent a relatively higher aft portion of the frame, respectively, the sleeves being upwardly open; a generally U-shaped member defining the openable arm rest having a pair of spaced-apart vertical legs and an intermediate portion interconnecting upper ends of the legs; each leg including a slidable portion linearly movably disposed in the respective sleeves to restrain the member to the frame and provide a secure arm rest and patient support, the slidable portion at the forward leg defining a free end of such leg and having a lesser length than the slidable portion of the aft leg so that the U-shaped member can be lifted in a vertical direction to disengage the slidable portion on the forward leg from the associated sleeve while the slidable portion on the aft leg remains within its associated sleeve, whereby the U-shaped member can be pivoted about a vertical axis about the aft leg through an arc of about 180° between the fully opened and the fully closed positions; means limiting a downward movement of the U-shaped member when it engages both sleeves beyond a predetermined amount; and means for preventing the complete disengagement of the U-shaped member from the aft sleeve; whereby the accidental weighing of a patient without the openable arm rest is prevented.

* * * * *